United States Patent
Tibussek et al.

[11] Patent Number: 6,102,139
[45] Date of Patent: Aug. 15, 2000

[54] DEVICE FOR DRILLING A BORE HOLE IN THE GROUND

[75] Inventors: Fritz Tibussek, Mönchengladbach; Peter Heinrichs, Wegberg, both of Germany

[73] Assignee: Wirth Maschinen- und Bohrgerate-Fabrik GmbH, Germany

[21] Appl. No.: 09/142,677

[22] PCT Filed: Mar. 11, 1997

[86] PCT No.: PCT/DE97/00469

§ 371 Date: Sep. 11, 1998

§ 102(e) Date: Sep. 11, 1998

[87] PCT Pub. No.: WO97/34070

PCT Pub. Date: Sep. 18, 1997

[30] Foreign Application Priority Data

Mar. 13, 1996 [DE] Germany .......................... 196 09 899

[51] Int. Cl.[7] .................................................. E21B 3/02
[52] U.S. Cl. .......................................... 175/296; 175/171
[58] Field of Search ................................ 172/65, 92, 215, 172/217, 218, 296, 297, 171, 417, 418

[56] References Cited

U.S. PATENT DOCUMENTS

| 2,921,805 | 1/1960 | Shevchenko . | |
|---|---|---|---|
| 4,371,041 | 2/1983 | Becker et al. | 173/28 |
| 4,711,310 | 12/1987 | Luen | 175/171 |
| 5,497,839 | 3/1996 | Moir | 175/65 |

FOREIGN PATENT DOCUMENTS

| 302 632 | 7/1988 | European Pat. Off. . |
|---|---|---|
| 627 543 | 5/1994 | European Pat. Off. . |
| 38 17 660 | 12/1989 | Germany . |
| 2 231 601 | 11/1990 | United Kingdom . |
| WO 89/08769 | 9/1989 | WIPO . |
| WO 90/12229 | 10/1990 | WIPO . |

*Primary Examiner*—Robert E. Pezzuto
*Attorney, Agent, or Firm*—Vickers, Daniels & Young

[57] ABSTRACT

A device for drilling a bore hole in the ground comprised of a rotary drive head and a hollow Connecting Rod Assembly on which the rotary drive head acts and which can be lowered into the hole in the ground through the rotary drive head. A tool head with several Drilling Hammers that work downwards and that are operated with a fluid driving medium are provided on the lower end of the Connecting Rod Assembly. In the case of an initial design form, a Rotary Connecting Head is located in the upper area of the Connecting Rod Assembly; a fluid driving medium under high pressure can be supplied to the upper end of the Connecting Rod Assembly through the rotary connecting head, and the rotary connecting head has a transition chamber in its Housing, sealed in the axial direction towards both sides and connected to an external Supply Line for the fluid operating medium. Several ring seals, grouped in stages in the axial direction and hydraulically pressure-balanced stage-by-stage, are provided in each case on both sides of the transition chamber. In the case of a second design form, the driving is done in an oscillatory fashion around a limited angle, which permits the use of flexible supply lines for the feed-in of scavenging and operating media and the discharge of excavated material.

39 Claims, 8 Drawing Sheets

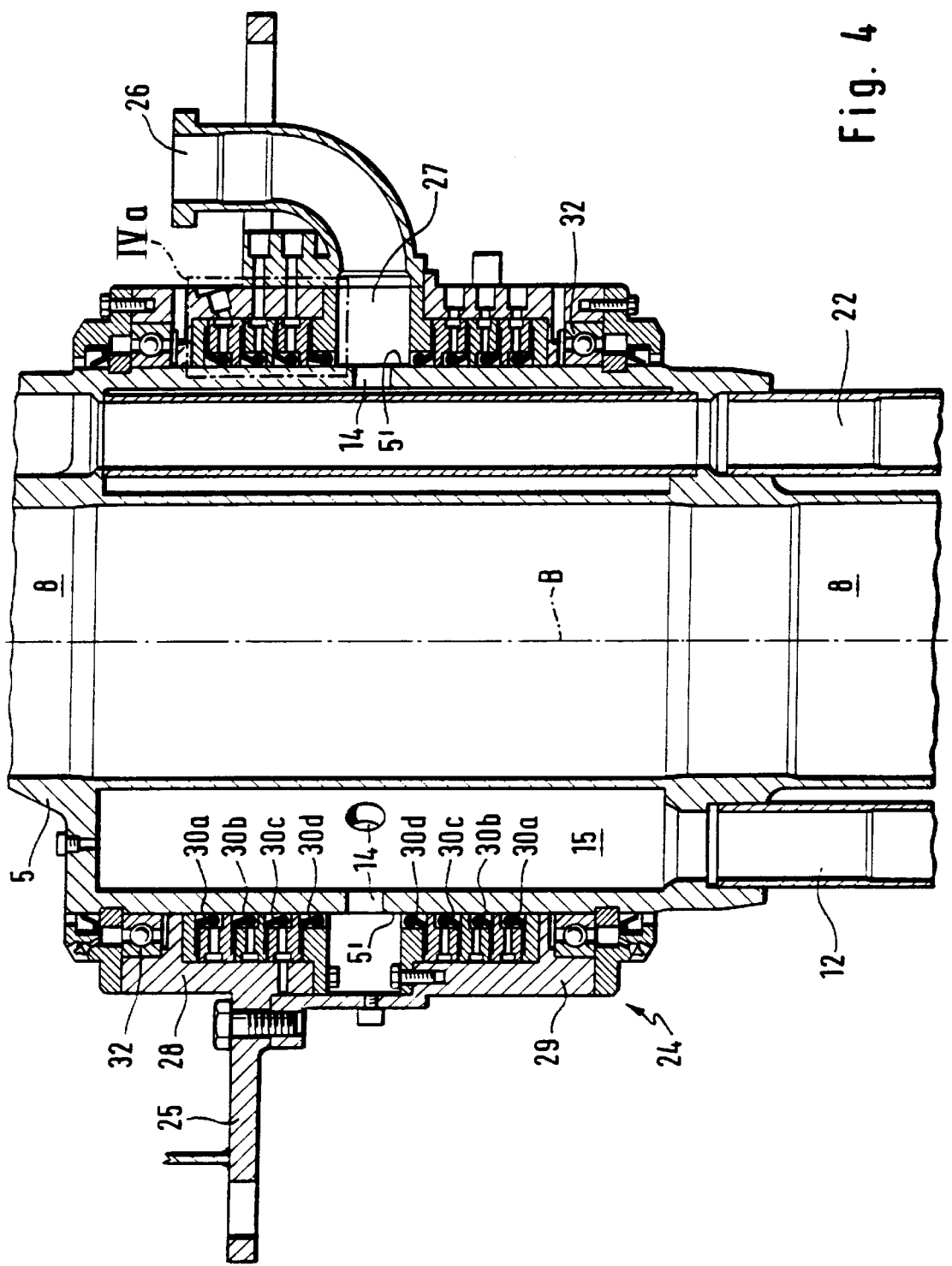

DEVICE FOR DRILLING A BORE HOLE IN THE GROUND

The invention involves a device for drilling a bore hole. In particular, the device for drilling a bore hole has a drive unit structure to be drilled in the ground which drive unit structure includes a stationary rotary drive head.

BACKGROUND OF THE INVENTION

Devices or machines for drilling a bore hole are known from the state of the art. The hammer tools are directly connected, several at a time, with the tool head here, so that the impact energy is transferred through the driving medium to the hammers plunged down into the bore hole. And from these directly to the bore hole floor, so that the connecting rod assembly remains uninfluenced by this to a great extent. The tool head is connected through the connecting rod assembly with a drive mechanism located outside of the bore hole, like a rotary drive unit, so that the hammers situated on the tool head work on areas of the bore hole floor that are always new. Work is primarily done with the devices at issue in solid rock.

This type of drilling has increasing significance in practice because, on one hand, the quality of the bore holes is better and the direction of the bore holes can be held on course nearly exactly; on the other hand, environmental criteria such as noise pollution are kept in significantly better compliance on the grounds of the sound-absorbing operating mode in the bore hole without any significant outside effect.

The removal of the rock material that has been hammered loose or scraped off from out of the bore hole can be done, in the case of systems of this type, within the hollow connecting rod assembly according to the so-called airlift process (reverse circulation). There is, in so doing, a fluid column in the bore hole, and air is blown into the drill column above the tool head like a scavenging fluid, so that a difference in pressure arises between the bore hole and the surface in the fluid column in the connecting rod assembly because of the air ascending in the connecting rod assembly. This difference in pressure induces in the connecting rod assembly a flow velocity with which the rock material is discharged through the connecting rod assembly.

When creating a hole in the ground via hammering, the inner diameter of the connecting rod assembly, which is available for the removal of the loosened material, has to have a certain minimum size that is adjusted to the total amount to be conveyed up. The rock chunks that are pounded loose also have larger dimensions in comparison to pure rotary drilling.

The fluid driving medium for the drilling hammers seated at the lower end of the connecting rod assembly is fed to the drilling hammers by the corresponding rotary connecting head at the upper end of the connecting rod assembly through a feeder constructed in or on the connecting rod assembly.

Problems result with regard to the seals of the rotary connecting head in the case of the relatively large diameters of the connecting rod assembly that are necessary, as mentioned.

Hammers that are driven hydraulically or pneumatically are operated at pressures of around 50 to 150 bar. It turned out that economical tool-life could not be achieved for the single seals previously used at the critical point of the transition between the fixed rotary connecting head and the rotating connecting rod assembly at these high pressures and with the airlift process requiring large diameters.

The problem involved with the invention is to improve a generic type of device in such a way that the device can be operated with longer repair-free periods with the larger external diameters of the hollow connecting rod assembly and the higher pressures that are necessary.

SUMMARY OF THE INVENTION

In accordance with the principal aspect of the present invention, a device for drilling a bore hole in the ground is provided, wherein the device includes a drive unit structure that is located above a bore hole to be drilled in the ground. The drive unit structure includes a stationary rotary drive head and a connecting rod assembly. The connecting rod assembly is surrounded in a ring-shaped manner by a housing arranged in an upright fashion as a rule. The fluid driving medium, such as air, water or a hydraulic oil, can be fed in by an external supply line through a fixed connection leading into the transition chamber. The transition chamber surrounds the connecting rod assembly in a ring shape here, so that the driving medium is in contact with the supply line for the operating medium independently of the rotary position of the connecting rod assembly. Several ring seals, hydraulically pressure-balanced and grouped in stages in the axial direction in each case, are provided on both sides of the transition chamber.

The pressure balancing of the ring seals is chosen in such a way in the operation of the device that the pressure difference acting on each ring seal does not exceed a maximum value, which is dependent on the characteristics of the seal used. On top of this, a pressure is applied in each case on the side of each ring seal turned away from the transition chamber in the axial direction that is lower than the pressure applied to the side turned towards the transition chamber. The difference in pressure, under the action of which the seal is pressed against the external circumference of the connecting rod assembly, corresponds to a value that can be permanently endured by the ring seal. In the case of the outer ring seal in the axial direction, i.e. the ring seal following in the direction pointing away from the transition chamber, the leading balancing pressure, in the form of an applied pressure, and a balancing pressure that is lower by an appropriate value are adjacent; the latter is in turn the balancing pressure for the subsequent seal. The applied pressures become lower in this way, stage-by-stage; the individual ring seal has to only endure in the process a pressure of 10 to 25 bar, for example, which is still permissible in each case. An adaptation to the operating pressure of the fluid operating medium can take place through the number of ring seals used and the balancing pressures chosen.

In one embodiment, the device for drilling a bore hole in the ground includes a drive unit structure located above the bore hole and having a stationary rotary drive head and a hollow connecting rod assembly on which the rotary drive head acts and which can be lowered through the rotary drive head down into the bore hole, and a first stationary rotary connecting head in the drive unit structure. A scavenging medium is supplied to the upper end of the rotating connecting rod assembly through the rotary connecting head. The scavenging medium is fed through a first feeder extending along the connecting rod assembly to an inlet opening provided on the connecting rod assembly. A second rotary connecting head is located in the drive unit structure. A fluid operating medium under high pressure is supplied to the upper end of the connecting rod assembly through the second rotary connecting head. The operating medium is fed through a second feeder extending along the connecting rod assembly to the lower end of the connecting rod assembly. The rotary connecting head has a housing surrounding the connecting rod assembly in a ring shape with a transition chamber connected with an outer supply line for the fluid driving medium and with the upper end of the second feeder, and sealed towards both sides in the axial direction. A tool head, designed in the form of a flushing head, is located on the lower end of the connecting rod assembly. The tool head is connected with the interior of the connecting rod assembly, and with several drilling hammers operated with the fluid driving medium, located on the tool head, and operating downwards. Several ring seals grouped in stages in the axial direction in each case and hydraulically pressure-balanced in stages are provided in the second rotary connecting head on both sides of the transition chamber.

In accordance with another aspect of the present invention, hydraulic pressures supplied to the ring seals for pressure balancing are preferably provided by pressure generators, and act in toroidal chambers, that are each located between two ring seals on the side turned away from the transition chamber. In one embodiment, a ring-shaped chamber is located in each case on the side of a ring seal turned away from the transition chamber. The ring-shaped chamber has a connection for the feed-in of a hydraulic pressure medium and is connected to a side of the same balancing pressure in the ring seals.

In accordance with yet another aspect of the present invention pumps are used for the generation of the balancing pressures existing in stages. In one embodiment, the pumps are provided as pressure generators.

In accordance with still another aspect of the present invention, pressure reducers in the form of pressure cylinders with one-sided pressure surface reduction through a piston rod are used as pressure reducers; the driving medium and therefore its pressure can be supplied to the side of the cylinder having the piston rod, so that a pressure that is reduced by a fixed percentage relative to the pressure of the operating medium is forcibly set through the piston rod diameter and the remaining, reduced active area on the other side of the piston. In the case of the pressure gradation resulting forcibly in this way through the geometry of the piston rod, there is an advantage that a variation of the pressure of the operating medium is automatically distributed over the individual pressure differences acting on the individual ring seals, without a readjustment of the individual balancing pressures being necessary. This type of supply of the balancing pressures is therefore independent from the functioning of the pumps and control valves. As many pressure reducers are used as there are stages of balancing pressure necessary; the differences in the reduced pressures are generated through differing piston rod diameters. In one embodiment, pressure reducers beset with pressure by the driving medium being provided as pressure generators. In another embodiment, the pressure reducers containing cylinders for which the pressure of the driving medium can be fed to the piston-rod side of the cylinder, and the pressure generated in the cylinder compartment on the other side of the piston, through its entire cross section, is reduced in accordance with the effective surface reduction on the piston-rod side and being feedable in each case to an accompanying ring-shaped chamber. In still another embodiment, the pressure reducers are located on the fixed housing of the second rotary connecting head.

The pressure generators can be arranged for practical purposes on the fixed housing of the rotary connecting head, which is simple with regard to the construction aspects and which makes short connection lines possible.

If the stage-by-stage pressure-balancing of the ring seals takes place symmetrically towards both sides of the transition chamber, two toroidal chambers can always be connected to a pressure reducer.

In accordance with still yet another aspect of the present invention, the rotary driving head of the connecting rod assembly alternately rotates forwards and backwards by a limited angle of rotation. The angle which the connecting rod assembly, and therefore the tool head, has to pass through during every rotation depends on the number of hammers on the same radius in the tool head. In the case of two hammers on the same radius, for example, an angle that is passed through of 180° is sufficient; it can also be advantageous, however, to rotate the rod assembly by an angle that is larger than the angle that is sufficient.

The advantage of this second design form is that no rotary seals that are subject to wear are necessary in the supply line for the pressurized operating medium to make the rotation of the connecting rod assembly possible. The connection of the supply line to the feeder can be done through flexible tubes, for example, the lengths of which are dimensioned in such a way that the can follow the required angle sweep. The supply line for the fluid driving medium can have a fixed connection with the feeder because of the angle of rotation that is limited by the alternating mode of operation. The actual rotary connection for the fluid driving medium with surfaces that rotate against each other, acting on the seals, can be saved. In one embodiment, the device for drilling a bore hole in the ground causes excavated material to be transported out of the bore hole through the interior of the connecting rod assembly and through an outlet line connected at its upper end. A first feeder for leading in a scavenging medium extends up to an inlet opening to the interior of the connecting rod assembly and communicates with the inlet opening. A second feeder through which a fluid operating medium, driving excavation tools provided on the tool head and under pressure, is fed to a tool head located at the lower end of the connecting rod assembly. The rotary drive device drives the connecting rod assembly alternating in the direction of rotation by a limited angle of rotation. The second feeder has a flexible area that makes a connection with a device for impinging with pressure from the pressurized operating medium.

In accordance with another aspect of the present invention, the feeder that is for guiding the compressed air into the interior of the connecting rod assembly to lift up the excavated material also has a flexible area which makes the alternating, limited rotary movement possible. This is because the rotary seal which is also otherwise necessary for this is saved due to this design arrangement. In one embodiment, the first feeder has a flexible area that makes a connection to advice for impinging with pressure from the scavenging medium.

In still another aspect of the present invention, the device can completely do without rotary feedthroughs, which are susceptible to wear and which are expensive to manufacture, with the corresponding seals. In one embodiment, the outlet line has a flexible area that makes the discharge of the excavation material possible.

In still yet another aspect of the present invention one or both of the supply lines are designed in the form of flexible tube lines.

In accordance with a further aspect of the present invention, to design the supply lines are rigid over the length of the connecting rod assembly, to affix it to this and to merely design a short piece of line leading from these to be flexible.

In accordance with yet a further aspect of the present invention, a power rotary head supported so as to be variable in height on the support apparatus and connected with the upper end of the segmented connecting rod assembly serves as a rotary drive unit in the case of an initial design form of this device according to the invention. The advance is brought about in the case of this design form through the lowering of the power rotary head. If the power rotary head has reached its lower position, i.e. the bore hole has been drilled down by a segment length, it has to be released from the upper end of the connecting rod assembly and subsequently moved into its upper position. A free length exists in this position between the flange serving to fasten the driven part of the power rotary head and the upper end of the connecting rod assembly; the free length corresponds at a minimum to that of a segment of the connecting rod assembly. A further segment of the connecting rod assembly can now be used. The support apparatus has to therefore have a height that corresponds at a minimum to the length of a segment.

In accordance with another aspect of the present invention the rotary drive unit is designed, as an alternative, as a rotary drive that is actually constructively familiar from pipework and that can be brought into working contact with the surface shell of the connecting rod assembly—through a clamping handle, for example.

In accordance with yet another aspect of the present invention advancing forces can also be led into the connecting rod assembly through the rotary drive unit. The advance can take place on the whole through a periodic "resetting" of the rotary drive unit by relocating it to the top in the released state by a certain distance, subsequently affixing it again on the surface shell of the connecting rod assembly and lowering it from anew. Because the rotary drive unit can be affixed on nearly any arbitrary point with reference to the length of the connecting rod assembly, it is no longer necessary that the lifting stroke by which the rotary drive unit can be relocated in the direction of the lengthwise axis of the rod assembly corresponds at a minimum to the length of a segment of the same, so that the driving device can be constructed much lower in comparison to the those that are known up to now.

The height adjustment preferably serves a length-adjustable power generator, which is designed in the form of a hydraulically-actuated piston/cylinder unit.

In summary, there is provided a device for drilling a bore hole in the ground. The device includes a drive unit structure located above the bore hole, a stationary rotary drive head, and a hollow connecting rod assembly on which the rotary drive head acts and which can be lowered through the rotary drive head down into the bore hole in the ground. The device also includes a first stationary rotary connecting head in the drive unit structure, wherein a scavenging medium can be supplied to the upper end of the rotating connecting rod assembly through the first rotary connecting head. The scavenging medium can be fed through a first feeder extending along the connecting rod assembly to an inlet opening provided on the connecting rod assembly. The device further includes a second rotary connecting head located in the drive unit structure, wherein a fluid operating medium under high pressure can be supplied to the upper end of the connecting rod assembly through the rotary connecting head. The operating medium can be fed through a second feeder extending along the connecting rod assembly to the lower end of the connecting rod assembly. The rotary connecting head has a housing surrounding the connecting rod assembly in a ring shape with a transition chamber connected with the outer supply line for the fluid driving medium and with the upper end of the second feeder, and sealed towards both sides in the axial direction. A tool head, designed in the form of a flushing head, is located on the lower end of the connecting rod assembly. The tool head is connected with the interior of the connecting rod assembly, and with several drilling hammers to operate with the fluid driving medium, located on the tool head, and operating downwards. Several ring seals, grouped in stages in the axial direction in each case and hydraulically pressure-balanced in stages, are provided in the second rotary connecting head on both sides of the transition chamber. Preferably, a ring-shaped chamber is located on the side of a ring seal and turned away from the transition chamber. The ring-shaped chamber has a connection for the feed-in of a hydraulic pressure medium and is connected to a side of the same balancing the pressure in the ring seals. Preferably, pumps are provided as pressure generators. More preferably, pressure reducers beset with pressure by the driving medium are provided as pressure generators. Even more preferably, the pressure reducers contain cylinders for which the pressure of the driving medium can be fed to the piston-rod side of the cylinder, and the pressure generated in the cylinder compartment on the other side of the piston, through its entire cross section, is reduced in accordance with the effective surface reduction on the piston-rod side and being feedable in each case to an accompanying ring-shaped chamber. Still even more preferably, the pressure reducers are located on the fixed housing of the second rotary connecting head. Preferably, the stage-by-stage pressure-balancing of the ring seals takes place symmetrically towards both sides of the transition chamber. Preferably, a hollow connecting rod assembly and a first feeder is provided for leading in the scavenging medium. The feeder extends up to an inlet opening to the interior of the connecting rod assembly and communicates with the interior of the connecting rod assembly. A second feeder is provided through which a fluid operating medium, driving excavation tools provided on the tool head and under pressure, can be fed to a tool head located at the lower end of the connecting rod assembly.

The rotary drive device driving the connecting rod assembly alternate in the direction of rotation by a limited angle of rotation. The second feeder has a flexible area that, when the alternating rotational-direction movement occurs, makes a connection with a device for impinging with pressure from the pressurized operating medium. Preferably, the first feeder has a flexible area that, when the alternating rotational-direction movement occurs, makes a connection to a device for impinging with pressure from the scavenging medium. Preferably, the outlet line has a flexible area that, when the alternating rotational-direction movement occurs, makes the discharge of the excavation material possible. Preferably, one or both supply lines are designed as flexible tube lines. Preferably, the lines are designed so as to be rigid in the area of the connecting rod assembly and being affixed to this. Preferably, a power rotary head located at the upper end of the connecting rod assembly, supported so as to be variable in height on the support apparatus, serves as a rotary drive device. Preferably, a rotary drive unit, actually known constructively from pipework devices, which can as a choice be brought into active contact with the connecting rod assembly, being provided as a rotary drive device. Preferably, the rotary drive unit is located on the support apparatus so as to be adjustable in height. Preferably, length-adjustable power generators serving the height adjustment. Preferably, the length-adjustable power generator is designed as hydraulically-activated piston and/or cylinder units.

Further design arrangements of the invention can be found in the following description with reference to the drawings.

BRIEF DESCRIPTION OF THE DRAWINGS

The following are shown in the drawing:

FIG. 4 shows a lengthwise section going through the longitudinal axis through the upper part of the rotary connecting head depicted in FIG. 3 in an enlarged scale:

DESCRIPTION OF THE PREFERRED EMBODIMENTS

Figure 1:
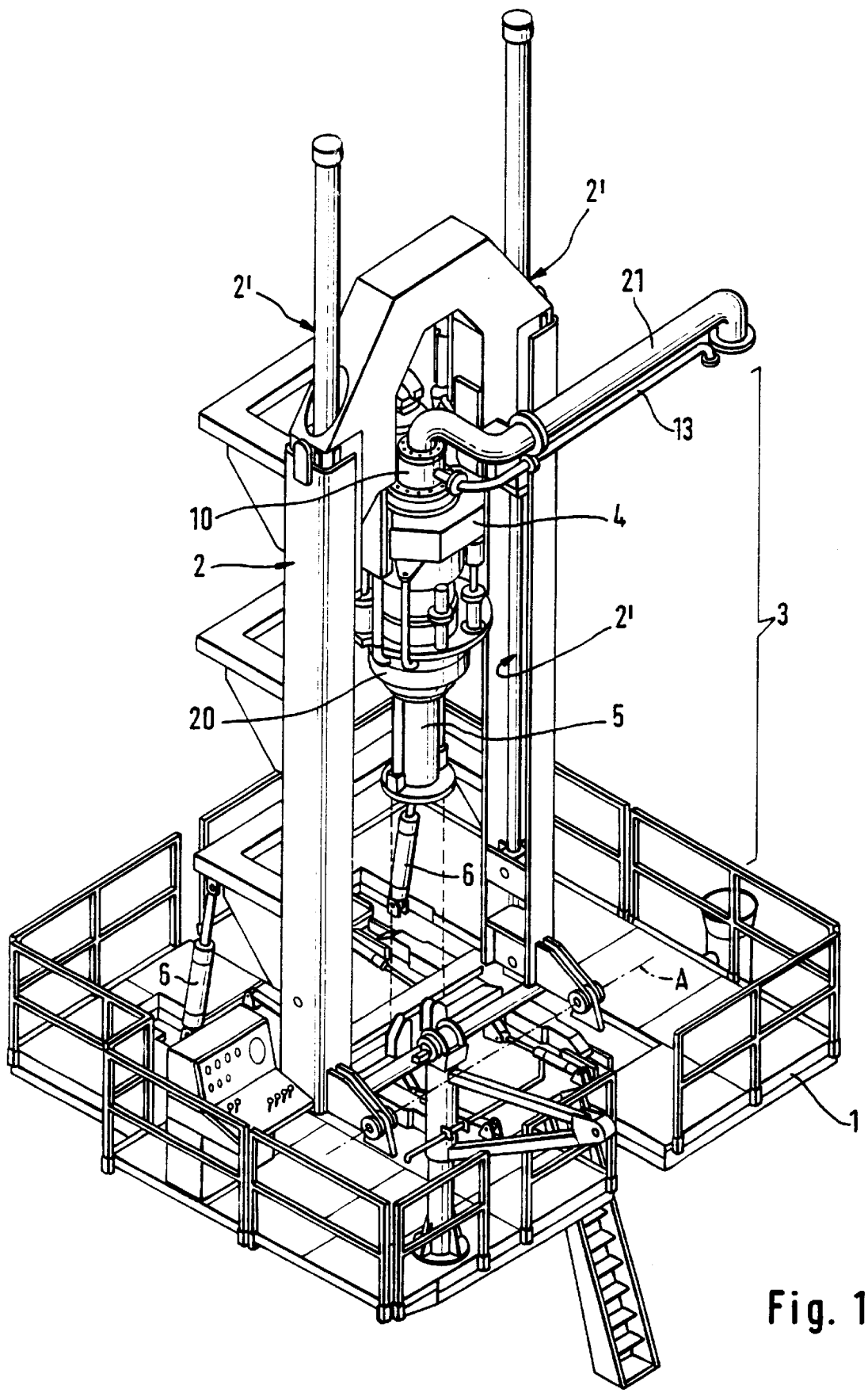
FIG. 1 shows, in perspective, a drive unit construction, located outside of the bore hole in the ground, of an initial design form according to the invention.

FIG. 1 shows the part of a device according to the invention of the initial design form located outside of a to-be-drilled hole in the ground. The drive construction of the device, designated overall with 3, is fastened to a Support Apparatus 2, which is supported on an operating designated overall with 1. A Rotary Drive Head 4, schematically shown, acts on a Connecting Rod Assembly 5 having segments that can be connected with each other, of which only the upper part is shown and which (only indicated with a dotted line) extends through the Operating Platform 1 into the to-be-drilled hole in the ground and up to the tool head. The driving of the Connecting Rod Assembly 5 with the Rotary Connecting Head 4 can be done in a customary manner, known from the state of the art, through a hydraulic motor for example.

Figure 1A:
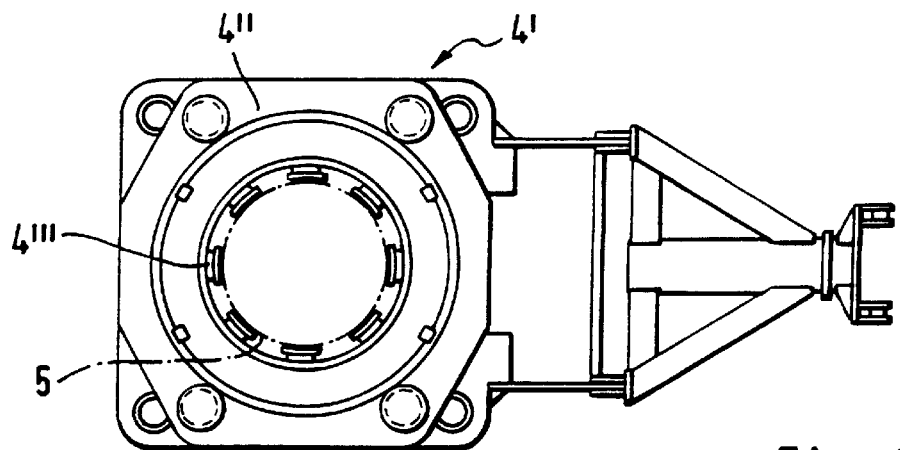
FIG. 1A shows a rotary drive unit, which can be used as an alternative to the rotary drive presented here in the case of the design form of the drive unit in accordance with FIG. 1.

It is alternatively possible, however, to use a Rotary Drive Unit 4' depicted in FIG. 1A, as it is actually constructively familiar from pipework devices, instead of the Rotary Drive Head 4 located at the upper end of the Connecting Rod Assembly 5.

This Rotary Drive Unit 4' a fixed, external Part 4" opposite to which there is a ring-shaped Inner Part 4''' that can be rotary driven, the inner diameter of which is adapted to the external diameter of the Connecting Rod Assembly 5 and with which a connection can alternately be made at least in the driving direction in an active connection, i.e. non-positive or positive-locking. The driving can take place, for example through a hydraulic motor. The Rotary Drive Unit 4' length-variable Power Generators 2' on the Support Apparatus 2, such as spindles or piston/cylinder units for example, can be in an active connection with its fixed Part 4". If the Connecting Rod Assembly 5 and the Inner Part 4''' of the Rotary Drive Unit 4' are designed in such a way that a positive-locking connection between this and the Inner Part 4''' can even be achieved in the lengthwise direction of the Connecting Rod Assembly 5, an advancing force can be led into the connecting rod assembly through the Rotary Drive Unit 4', so to speak. It is likewise possible, however, to support the Rotary Drive Unit 4' in a fixed manner on the support apparatus and design the Inner Part 4''' and the Connecting Rod Assembly 5 in such a way that the Connecting Rod Assembly 5 can be displaced in its lengthwise direction in the Inner Part 4'''. In this case, the advancing forces are to be led into the connecting rod assembly by acting, for example, on the first Rotary Connecting Head 10 still to be described.

A first rotary connecting head, designated with 10, is located at the upper end of the Connecting Rod Assembly 5. The material loosened at the base of the hole in the ground is carried off to the outside through the rotary connecting head through the Outlet Pipe 21, and compressed air is led into the connecting rod assembly by means of a first Supply Line 13. A second rotary connecting head, designated overall with 20, is located beneath the first Rotary Connecting Head 10. The Support Apparatus 2 can be swiveled around a Horizontal Axis A and is connected with Swivel Drives 6, so that it can be tilted, and holes in the ground can also be bored that deviate from the vertical direction.

Figure 2:
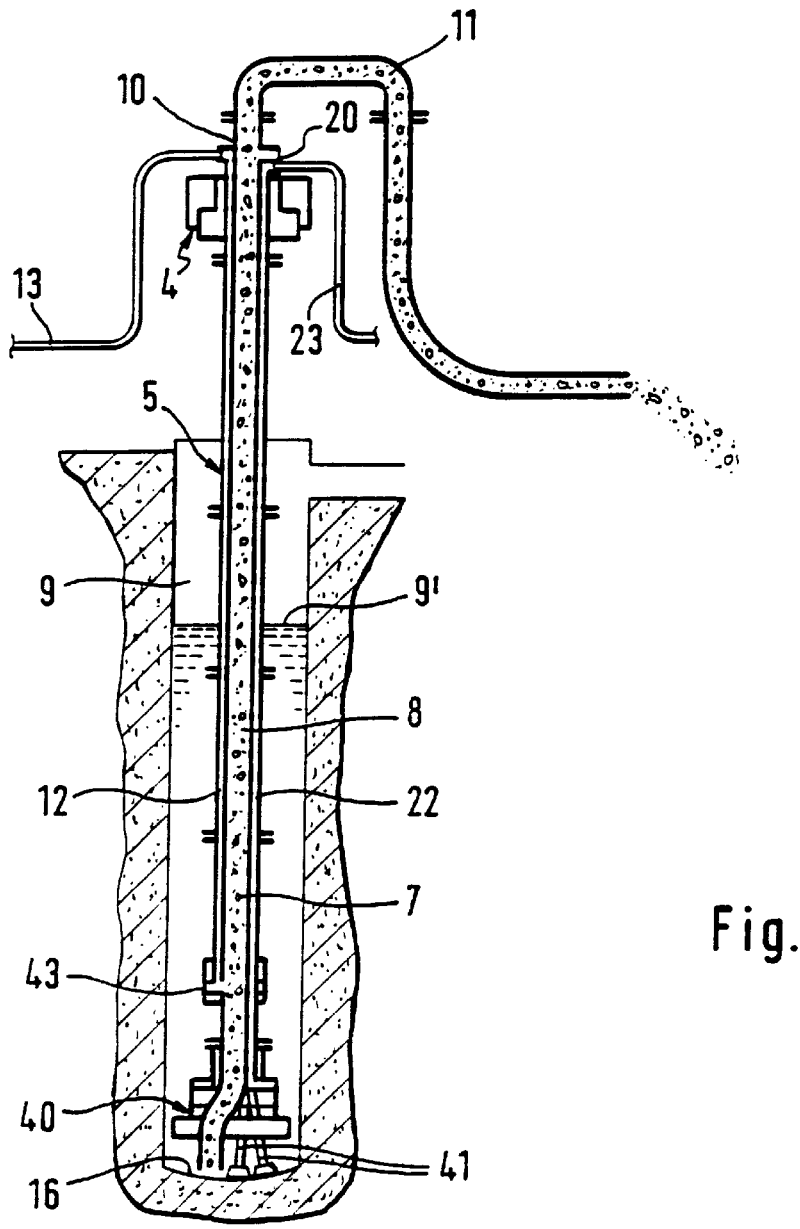
FIG. 2 schematically shows the mode of operation of the airlift system for the device according to the invention.

FIG. 2 schematically explains the process with which chunks of soil loosened with the Hammers 41 of the Tool Head 40 from the Floor 16 of the Hole in the Ground 9, partially filled with water, for example, up to a Level 9' are transported to the outside. The interior area of the Connecting Rod Assembly 5 forms a Scavenging Pipe 8 that is normally filled with water, into which air is blown in above the Tool Head 40 through an Inlet Flap 43. The air was compressed outside of the boring device with a compressor that is not shown and is guided downwards through a first Supply Line 13 and the first Rotary Connecting Head 10 by means of a first Feeder 12 along the Connecting Rod Assembly 5. The air that is blown in brings about an upwards flow within the Scavenging Pipe 8 through the difference in density between the liquid in Scavenging Pipe 8, which is interspersed with air bubbles, and the external liquid in the Hole in the Ground 9. The Soil Chunks 7 are transported up with the upwards flow and are scavenged out of the device through the Outlet Pipe 11. The operating medium is fed through a second Supply Line 23 in the second Connecting Head 20 of the second Feeder 22, shown in one piece with the first connecting head, and is led downwards through this along the Connecting Rod Assembly 5 to the drive unit of the Hammers 41 of the Tool Head 40.

Figure 3:
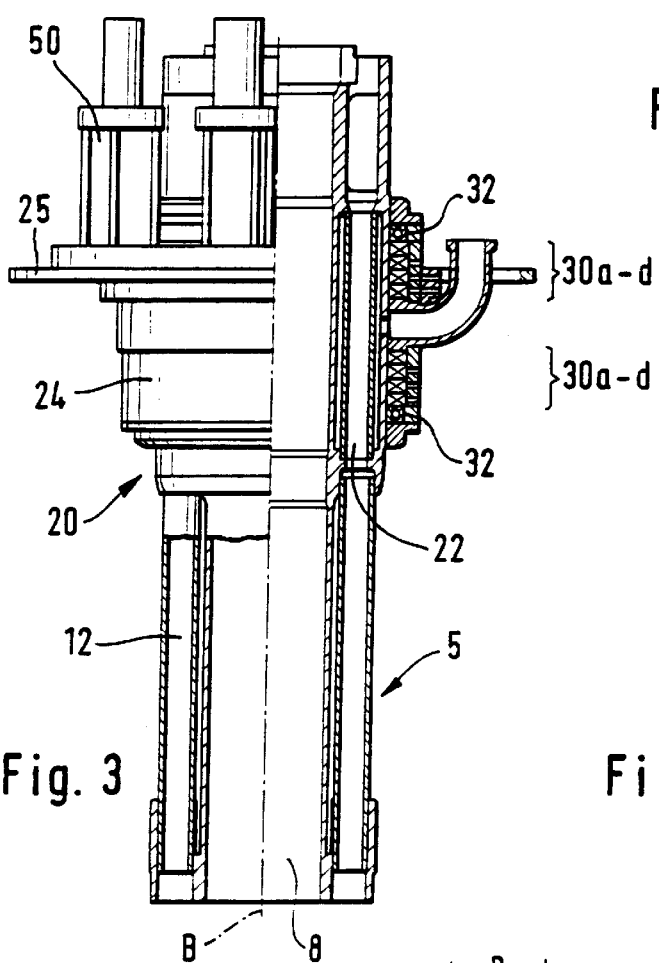
FIG. 3 shows the rotary connecting head for the fluid operating medium in a side view, partially as a sectional view.

FIG. 3 shows a side view of the second Pressure Connection Head 20; the left half in the view is reproduced and the right half shows a section through the second Rotary Connecting Head 20, going through Axis B of the Connecting Rod Assembly 5, for leading the operating medium into the second Feeder 22. Located within the Housing 24 are the staggered seal arrangements, the manner of operation of which will be described further below, and the Pivot Bearings 32, on which the Housing 24 is supported in a rotatable fashion on the external periphery of the Connecting Rod Assembly 5. The second Rotary Connecting Head 20 can be fastened through a Torsion Stay 25, for example, to the Support Apparatus 2 from FIG. 1. This fastening can be brought about by means of bolts that, if the second Rotary Connecting Head 20 is to also turn, only have to be unlatched. If the device according to the invention is to namely only be used for pure rotary drilling in the meantime, the detaching of the Housing 24 of the second Rotary Connecting Head 20 surrounding the Connecting Rod Assembly 5 serves the purpose that the second Rotary Connecting Head 20 can also turn after detaching the supply line for the fluid operating medium, so that the ring seals in this state are neither hydraulically nor mechanically stressed; the serviceable life is extended because of this.

Three Pressure Reducers 50 are fastened to the fixed Housing 24 in the example shown; their function will still be explained in more detail.

Figure 4A:
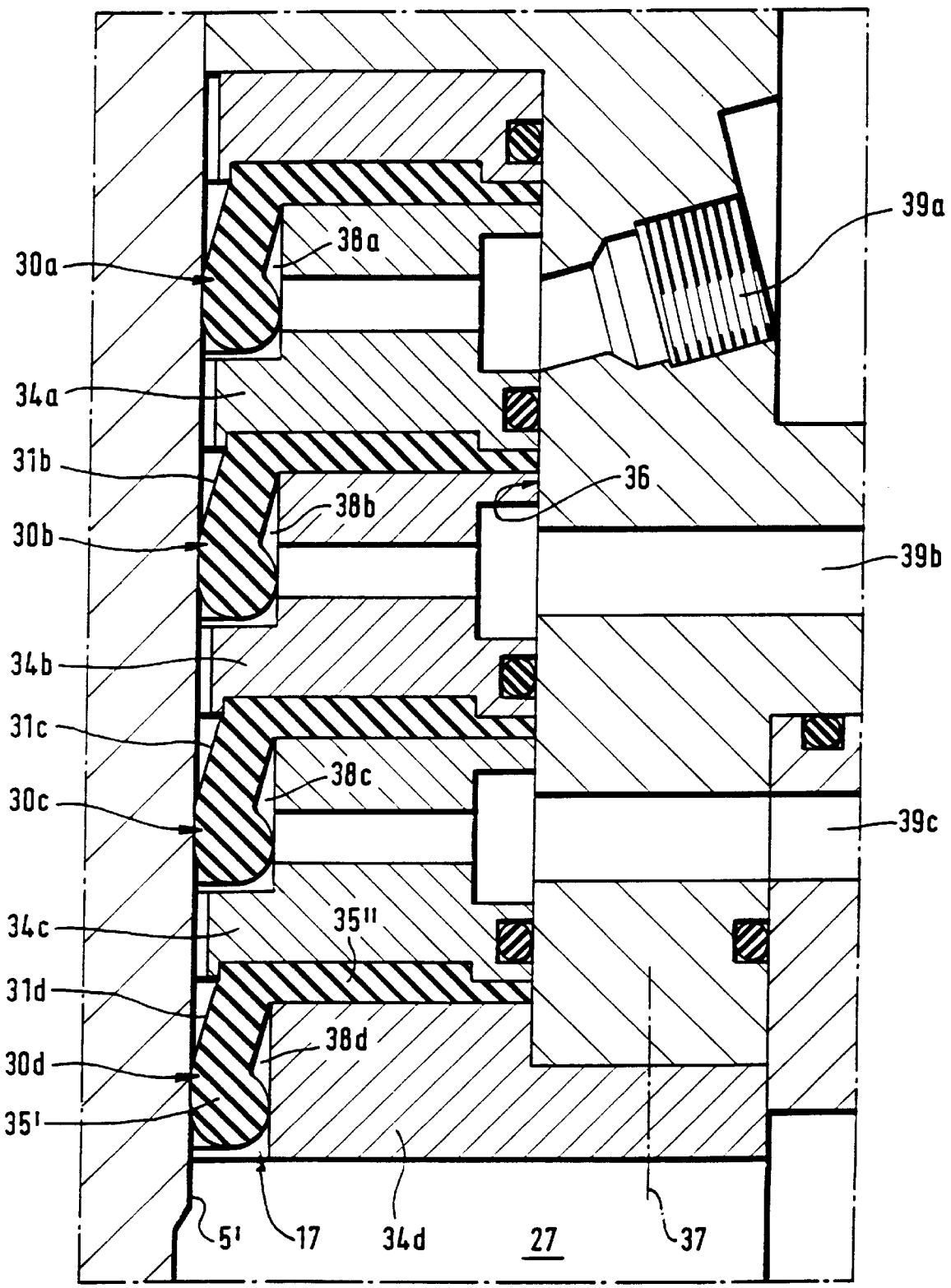
FIG. 4A shows an enlarged rendering of the area bordered by a dot-and-dash pattern, designated in FIG. 4 with IVa.

FIG. 4 shows a section through the second Rotary Connecting Head 20. The operating medium for driving the hammers—water is preferably used for environmental reasons and operating-technology reasons—is fed through a fixed Connection 26, to which the second Supply Line 23 (FIG. 2) is connected, to a Transition Chamber 27, which surrounds the Connecting Rod Assembly 5 in a ring shape. The surface of the Connecting Rod Assembly 5 should be smooth and even to the extent possible in the area of the second Rotary Connecting Head 20, so that the seals lying against it are not excessively strained with regard to wear and tear. The operating medium goes from the Transition Chamber 27 on the first Feeder 12, intersecting the Rotary Drive Head 20, for the scavenging medium onwards through Blow-By Openings 14 distributed over the periphery into a Toroidal Chamber 15 constructed on the upper end of the Connecting Rod Assembly 5, and from there into the second Feeder 22, in the form of a pipe, running along the outside of the Connecting Rod Assembly 5. The Feeder 12 is also a pipe running along the outside of the connecting rod assembly. The two Feeders 12 or 22, as the case may be, and the Scavenging Pipe 8 are therefore separated from each other.

The Housing 24 has an upper Flange 28 and a lower Flange 29, between which the Transition Chamber 27 for the operating medium is constructed in the second Feeder 22. Four ring seals, designated with 30a, 30b, 30c and 30d and grouped in stages one behind the other in the axial direction, are located on both sides of the Transition Chamber 27; the ring seals have a roughly L-shaped cross section in the design example. The one Leg 35' each ring seal (FIG. 4A) acts against the Transition Chamber 27 carrying the high pressure and is adjacent to the outer side on the rotating External Periphery 5' of the Connecting Rod Assembly 5. The other Leg 35" in each case extends outwards in a plane that is vertical to the axis of the Connecting Rod Assembly 5. The Legs 35" are each located between neighboring Rings 34a, 34b, 34c, 34d, which are housed in a cylindrical Chamber 36 of the housing neighboring on the External Periphery Surface 5' and pulled together with the Legs 35" located in between into a packet or block, so that all of the ring seals are fastened.

The Rings 34a, 34b, 34c, 34d leave ring-shaped Chambers 38a, 38b, 38c, 38d, for seating the Legs 35' of the ring seals, on their inner periphery surface turned towards the External Periphery Surface 5'. The ring-shaped Chambers 38a, 38b, 38c each have their own Connection 39a, 39b, 39c through which a pressure medium can be fed by a Pressure Reducer 50. The pressure medium fed to the respective ring-shaped Chambers 38a, 38b, 38c goes through the slot between the inner periphery of the neighboring ring turned towards the Transition Chamber 27 and the External Periphery Surface 5' to the back side of the next ring seal closer to the Transition Chamber 27.

The pressure gets, for example, in the ring-shaped Chamber 38c, to the Back Side 31d of the Leg 35' of the Ring Seal 30d and seeks to lift this up from the External Periphery Surface 5'. In the case of 17, the liquid that is under pressure penetrates into the ring-shaped Chamber 38d and presses the Leg 35' onto the External Periphery Surface 5. The pressure prevailing in the ring-shaped Chamber 38c acts against the pressure. The difference in pressure is controlling for the actual existing pressure. The pressure in the Connection 39c is selected in such a way that the active difference in pressure does not exceed a certain limit value in the range of around 10 to 25 bar, which the Ring Seal 30d permanently endures.

The pressure applied to the Connection 39c presses the Leg 35 of the Ring Seal 30c against the External Periphery Surface 5c. This pressure is generally too high for the Ring Seal 30c. A lower pressure is therefore applied to the Connection 39b; the lower pressure acts on the Outside 31c of the Leg 35' of the Ring Seal 30c so as to relieve pressure, so that the latter is not endangered. In the case of the next Ring Seal 30b, the pressure relief takes place with the pressure applied to the Connection 39a, which no longer endangers the Ring Seal 30a. The high pressure in the Transition Chamber 27 is dissipated in stages in this way, so that the Leg 35' is only pressed against every ring seal with a partial pressure that is not dangerous for it.

As already mentioned, Bearings 32 are located within the Housing 24, on which the Connecting Rod Assembly 5 can rotate within the fixed Housing 24 and that hold the ring seals radially in a defined position vis-à-vis the External Periphery Surface 5' of the connecting rod assembly forming the pressure surface. A moment of friction is transferred from the rotating External Periphery Surface 5' through the Ring Seals 30a, 30b, 30c 30d to the Housing 24, which is collected by the Torsion Stay 25 that has likewise already been mentioned.

The design form shown has been designed, for example, for a pressure of an operating medium of around 70 bar. The first ring-shaped Chamber 38d is beset with a pressure that comes to approx. 85% of the pressure of the operating medium in the Transition Chamber 27. The second ring-shaped Chamber 38c is beset with a pressure that comes to approx. 50% and the third ring-shaped Chamber 38b with a pressure that comes to approximately 15% of the pressure of the operating medium. It follows from this that the difference in pressure on the first Ring Seal 30d comes to approx. 10 bar, on the second and third Ring Seals 30b and 30c around 25 bar each and on the fourth Seal 30d around 10 bar again. No wear and tear that is too high arises at these pressures despite the large external periphery of the Connecting Rod Assembly 5 and a peripheral speed of 5 to 20 m generated on the External Periphery Surface 5' by the rotary drive head; experience has shown that this high wear and tear is unavoidable if only one seal is under the entire pressure in the Transition Chamber 27.

Depending on the pressures of the operating medium, the number of ring seals can be varied, but always in such a way that the difference in pressure on the individual ring seal does not exceed a limit value of 25 bar, for example.

Figure 5A:
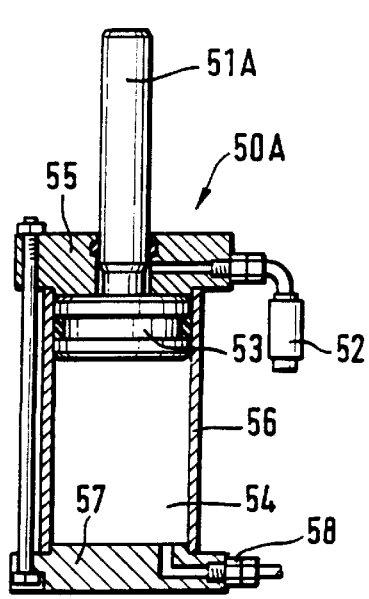
FIG. 5 schematically shows sectional views of three pressure reducers with different piston rod diameters.
Figure 5B:
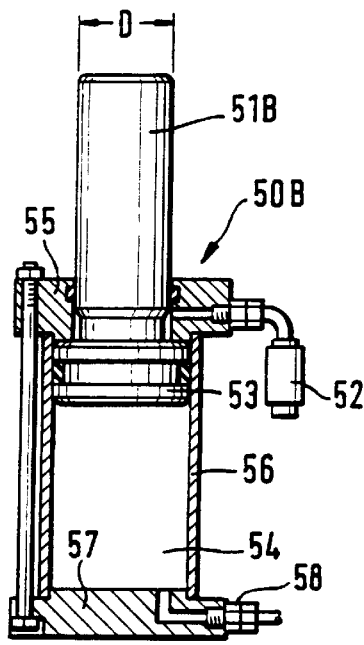
Figure 5C:
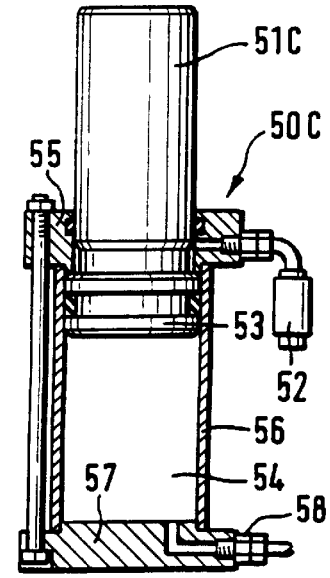

The pressure-balancing of the individual Ring Seals 30d, 30c, 30b is controlled in a fixed dependence by the pressure of the operating medium over the geometry of the individual Pressure Reducers 50. FIGS. 5A, 5B and 5C show the structure of three Pressure Reducers 50A, 50B and 50C designed in the form of Hydraulic Cylinders 56. The Cylinders 56 each have a Head Plate 55 and a Floor Plate 57, as well as a Piston Rod 51A, 51B and 51C of different diameters D reaching through the Head Plate 55, but the same Pistons 53 and Cylinder Chambers 54 of the same diameter closed up to the Connections 58 in the Floor Plate 57. The operating medium is fed to the Cylinder 56 in each case through a Connection 52 on the piston rod side, i.e. in the Head Plate 55. The Cylinder Chamber 54 is filled with a hydraulic medium differing from the operating medium and is connected with a Connection 39a, 39b, 39c of a Toroidal Chamber 38a, 38b, 38c through the Connection 58 and hydraulic lines. If the diameter of the Cylinder Chambers 54 and the Piston 53 is the same for all of the Pressure Reducers 50 that are used, the pressure in the ring-shaped Chambers 38a, 38b, 38c generated with the Pressure Reducers 50 is only determined by the residual cross section of the Cylinder Chamber 54 remaining after taking away the cross section of the piston rod. The Pressure Reducer 50A with the smallest piston rod cross section therefore generates the highest pressure. It is connected to the ring-shaped Chamber 38c.

The hydraulic medium in the Cylinder Chambers 54 and the ring-shaped Chambers 38a, 38b, 38c is preferred as a lubricant, e.g. a grease, which lubricates the Ring Seals 30a, 30b, 30c, 30d. The ring seals consist of an elastomer material.

Figure 6:
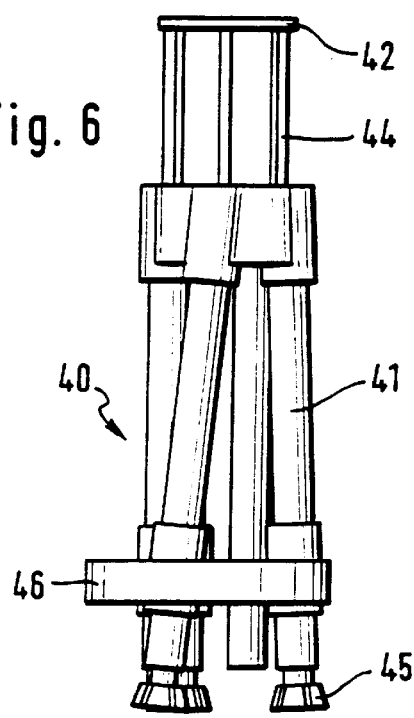
FIG. 6 shows a side view of a tool head with several drilling hammers.
Figure 7:
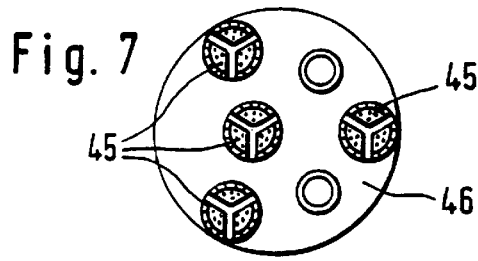
FIG. 7 shows a view in accordance with FIG. 6 from the bottom.

A Tool Head 40 is shown in FIGS. 6 and 7, which is provided, for example, for driving with water as the operating medium. The Hammers 41 driven by the operating medium are connected with a Mounting Plate 42 through Supports 44; the mounting plate is attached at the lower end of the Connecting Rod Assembly 5. The Tools 45 arranged on the Hammers 41 act downwards on the Floor 10 of the Hole in the Ground 9 (FIG. 2) and smash the rock there. The respective point of action moves along through the rotation of the Tool Head 40 in the direction of the periphery. The entire cross section of the bore hole can be swept over through the attachment of the Tools 45 at difference radii. The number and arrangement of the Tools 45 can be adapted to the diameter of the Hole in the Ground 9 and the material to be excavated. The Hammers 41 are held and guided on their lower ends on a circular disk-shaped Guide Plate 46 of a diameter corresponding to the diameter of the hole in the ground.

Figure 8:
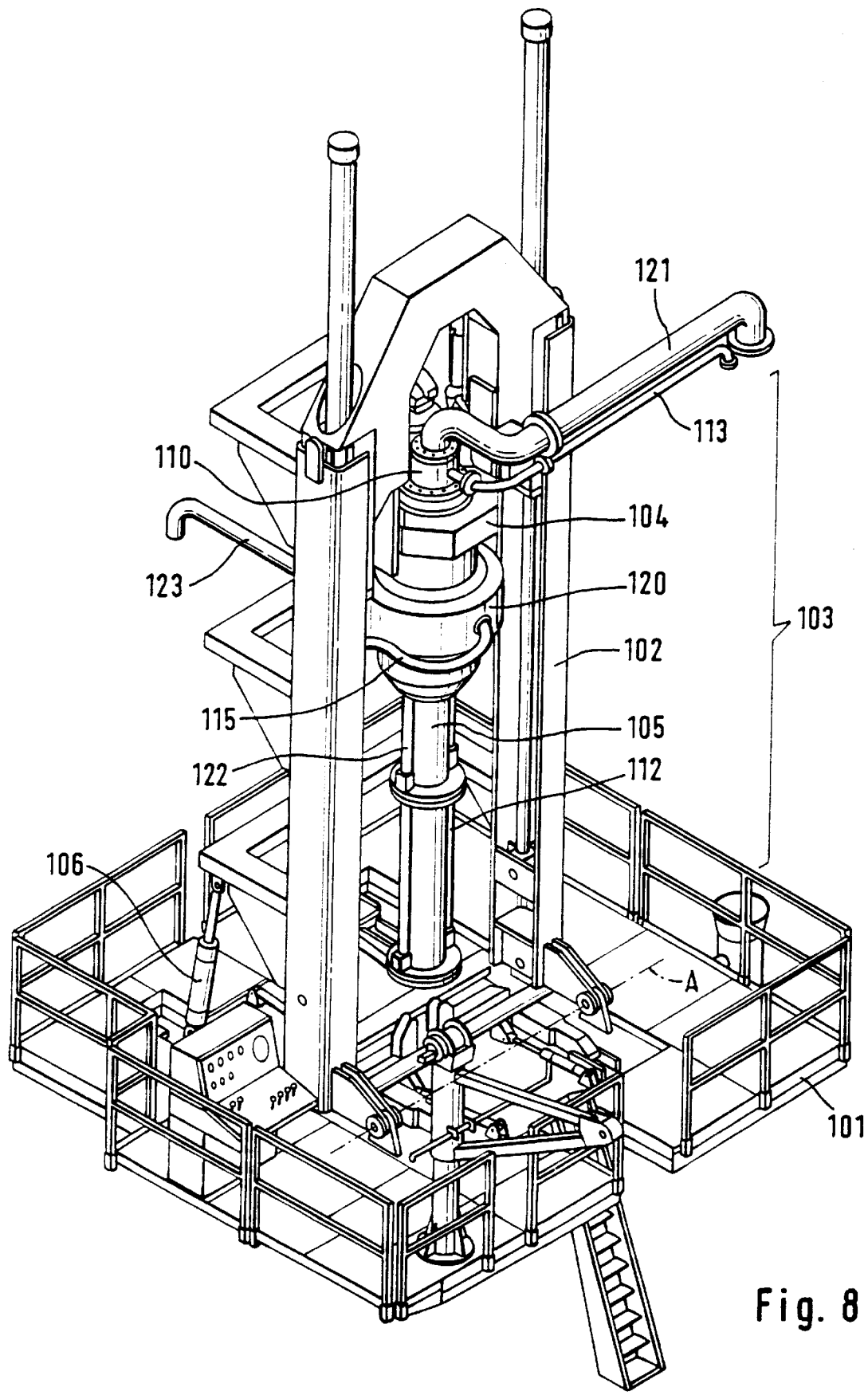
FIG. 8 shows, in perspective, a view corresponding to FIG. 1 of a second design form according to the invention.

FIG. 8 shows a second design form. Parts that are appropriate for each others' functions are provided with reference signs increased by 100. The basic structure corresponds to a great degree to that of FIG. 1. The description there is applicable to that extent for the design form at issue.

The drive unit structure of the device, designated overall with 103, is fastened to a Support Apparatus 102, which is supported on an operating platform designated overall with 101. A Rotary Drive Head 104, which is schematically shown, acts on a Connecting Rod Assembly 105 that extends through the Operating Platform 101 into the hole in the ground to be drilled and up to the tool. The driving of the Connecting Rod Assembly 105 by means of the Rotary Drive Head 104 can take place in a customary manner that is known from the state of the art.

A first connecting head, designated with 110, is located at the upper end of the Connecting Rod Assembly 105; the material loosened on the floor of the hole in the ground is carried away to the outside through the connecting head through the Outlet Pipe 121, and a scavenging fluid, usually air, is led in by means of a first Supply Line 113 in the Connecting Rod Assembly 105. A second connecting head, designated overall with 120, is located beneath the first Connecting Head 110. The Support Apparatus 102 can be tilted around a Horizontal Axis A by means of Swivel Drives 106, so that holes in the ground that deviate from the vertical can also be drilled.

In the case of the second design form of the invention, the second Connecting Head 120 can also rotate as a whole with the Connecting Rod Assembly 105, and only the first Rotary Connecting Head 100 is mounted so as to be stationary. The Rotary Drive Head 104 is designed in such a way that it rotates the Connecting Rod Assembly 105, together with the second Connecting Head 120 for the driving medium of the hammers in the tool, back and forth in an oscillatory motion by a predetermined angle around the rotational axis of the Rod Assembly 105. This angle that is swept through is under 360°, as a rule, and is chosen in dependence on the number and the position of the Hammers 41 lying on the same radius (FIGS. 6 and 7). When there is only one Hammer 41 per radius, 360° are required; in the case of two hammers per radius displaced by 180° to each other, a back-and-forth rotation of 180° suffices. It is likewise within the framework of the invention, though, to rotate the tool head back and forth by a limited angle that is, however, larger than 360°.

Because of the limited angle of rotation, it is possible to work with a supply line for the driving medium that is installed in a stationary manner and that goes along with the angle of rotation, without requiring a rotary seal. In the design example shown, the driving medium is led into the second Feeder 122 of the Connecting Rod Assembly 105 by means of a flexible Tube 115. The Tube 115 is mounted between the second Supply Line 123 and the second Feeder 122. The length of the Tube 115 is chosen in such a way that the Tube 115 can follow the rotation of the Connecting Rod Assembly 105 without obstructing it.

Figure 9:
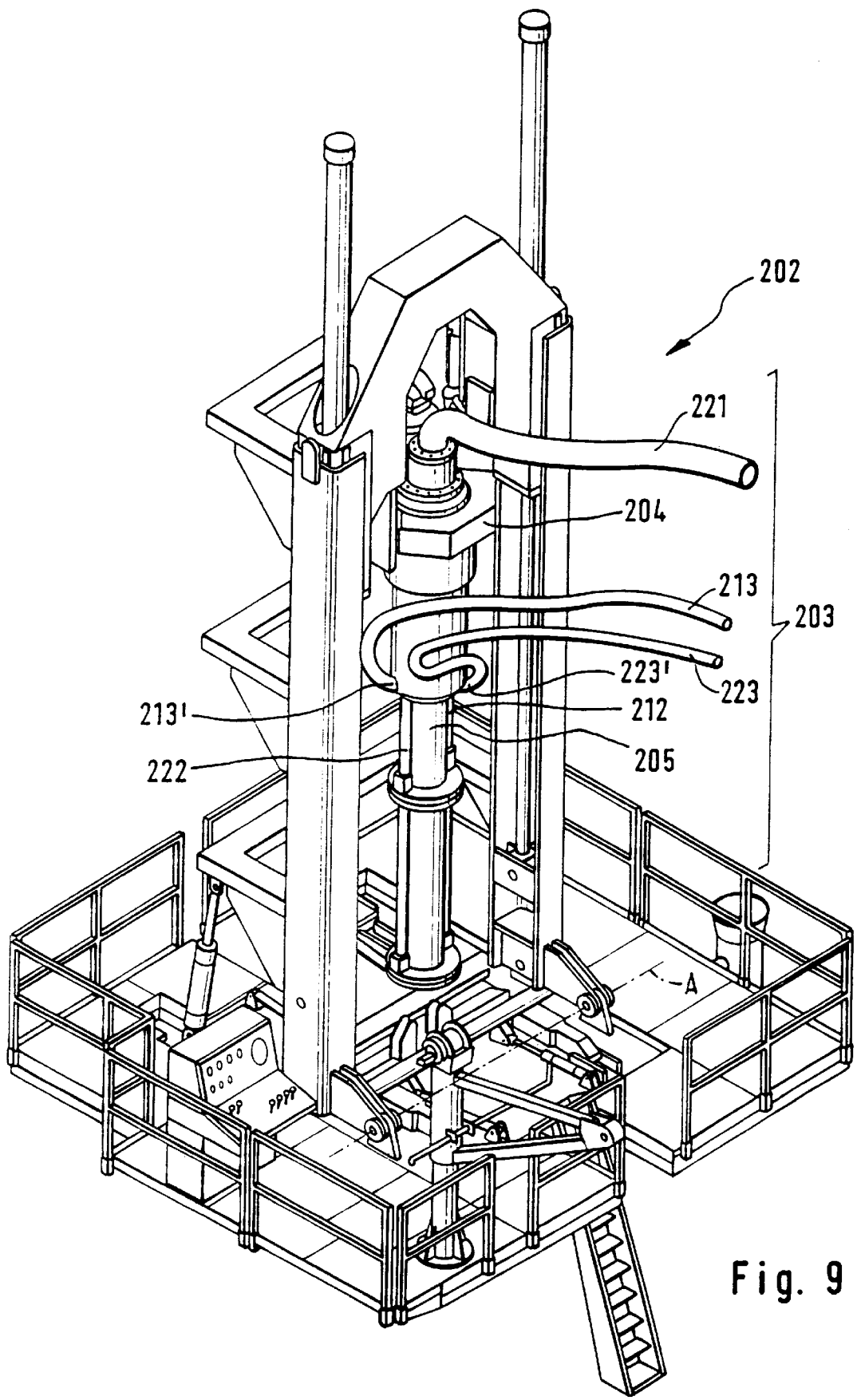
FIGS. 9 and 10 show two further design forms of the device according to the invention in a view corresponding to FIG. 8

In the case of a further design form, depicted in FIG. 9, for which parts that are appropriate for each others' functions are provided with reference signs increased by 200 vis-à-vis FIG. 1, the Supply Line 223 for the operating medium, the Supply Line 213 for the aeration and the Outlet Pipe 221 are designed as flexible tubes. The two Supply Lines 213 and 223 are connected with the Lines 212, 222 running on the Connecting Rod Assembly 205 through flange arrangements not depicted individually beneath the Rotary Drive Unit 204 at the Points 213',223'. The compressed air of the inlet opening (43 in FIG. 2) or, as the case may be, the operating medium is fed to the tool head (40 in FIG. 2) through the lines (running on the connecting rod assembly). The advantage of this design form consists in the Rotary Drive Head 204, which only brings about an oscillatory movement in this case, having to only contain a pivot bearing for the Connecting Rod Assembly 205; rotary feedthroughs and rotary seals can, however, be done without entirely.

It is to be pointed out in connection with this that it is not absolutely necessary to connect the flexible Tubes 213, 223 with the Lines 212, 222 at the Points 213' and 223'. It is rather within the framework of the invention as well to completely do without the rigid Lines 212, 222, and to lead the Tubes 213, 223 up to the corresponding connection points lying in the bore hole on the connecting rod assembly or on the tool head.

Instead of the Rotary Drive Head 204 continually acting on the upper end of the upper segment of the Connecting Rod Assembly 205, it is also possible in the case of this design form to provide a Rotary Drive Unit 4', which acts externally on the Connecting Rod Assembly 205 and the operating mode and functioning of which also otherwise correspond to those of Rotary Drive Unit 4', but which merely brings about a back-and-forth movement of the connecting rod assembly.

Figure 11:
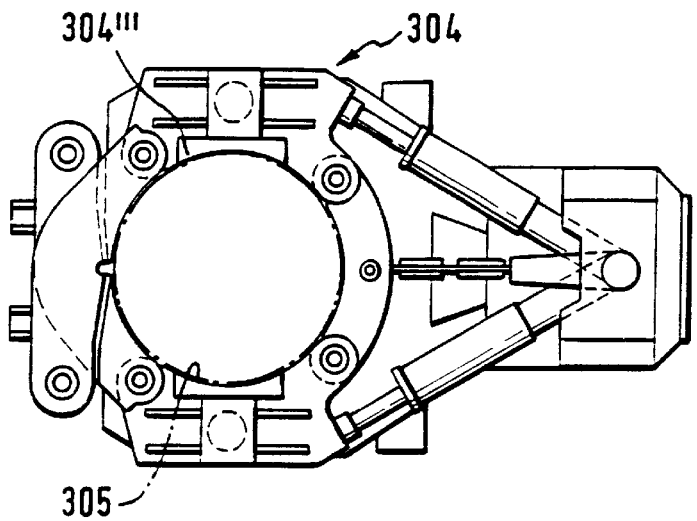
FIG. 11 shows an oscillation drive, as it can be used in the design in accordance with FIG. 10.

The Rotary Drive Unit 304' depicted in FIG. 11, which is actually known from pipework machines and should therefore not be described in detail any longer, contains a Part 304''', which can be put into oscillatory movement with the aid of two piston/cylinder units and which is designed to be able to be swung open in multiple parts over its periphery. The Part 304''' slid onto this is closed for coupling to the Connecting Rod Assembly 305, so that it is in the effective direction of the cut with the surface shell of the Connecting Rod Assembly 205.

Figure 10:
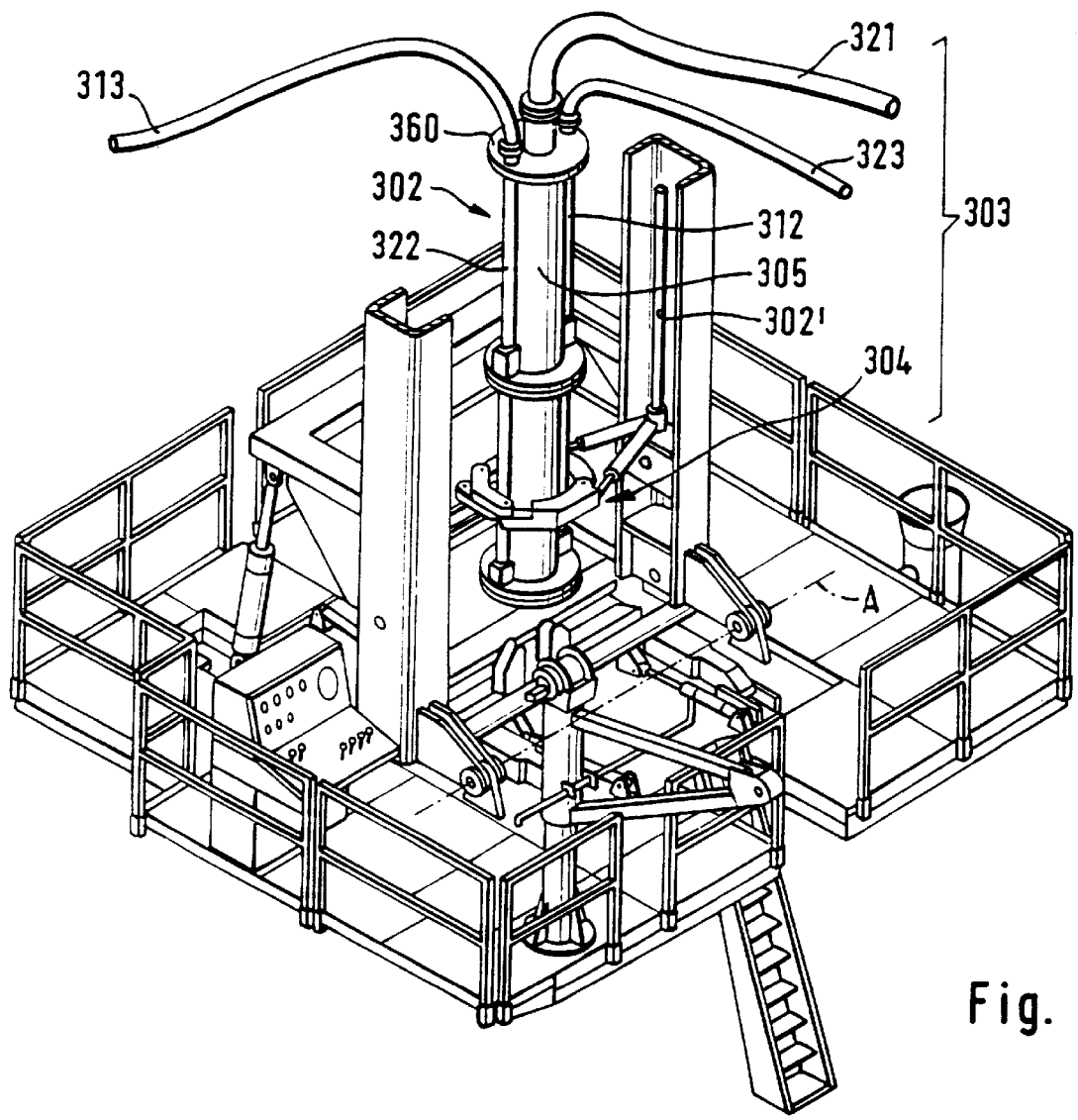

A further design form of the device according to the invention is depicted in FIG. 10. Parts that are appropriate for each others' functions are provided with reference signs increased by 300 regarding the design form in FIG. 1. An upper bearing arrangement within the framework of the Rotary Drive Unit 204 in FIG. 9 or of a rotary connecting head is completely done without for this. A Drive Unit 304 serves the oscillation drive; the drive unit corresponds in its function to the one depicted in FIG. 11 and described above.

The connection of the Tube Lines 313, 323 with the Feeders 312, 322 or of the Tube Line 321 with the interior of the Connecting Rod Assembly 305 is done with the aid of the Flange Head 360, located at the upper end of the upper segment of the connection mount, which is designed in such a way that connections provided on this for the Tube Lines 313, 323, 321 communicate with the Lines 312, 322 or the interior of the connecting rod assembly.

The Drive Unit 304 is supported on the Support Unit 302 through length-adjustable power generators 302', so that the advancing force can also be led through the Drive Unit 304 into the connecting rod assembly through a lowering of the Drive Unit 304. If the Drive Unit 304 has reached its lower position, a further advance can be brought about through "remounting", by loosening it and setting it in place again, after it has been moved into a higher position with the aid of the power generator, and the process begins from anew. Because no support unit, the length of which corresponds to at least that of a segment of the Connecting Rod Assembly 5, is required for this device, this design form distinguishes itself by a particularly low overall height.

What is claimed is:

1. A device for drilling a bore hole in the ground comprising:
    a drive unit structure to be located above the bore hole,
    a stationary rotary drive head,
    a hollow connecting rod assembly on which the rotary drive head acts and which can be lowered through the rotary drive head down into the bore hole in the ground,
    a first stationary rotary connecting head in the drive unit structure; a scavenging medium being supplied to an upper end of the connecting rod assembly through the first rotary connecting head; the scavenging medium being fed through a first feeder extending along the connecting rod assemble to an inlet opening provided on the connecting rod assembly;
    a second rotary connecting head located in the drive unit structure, a fluid operating medium under high pressure being supplied to the upper end of the connecting rod assembly through the second rotary connecting head, the fluid operating medium being fed through a second feeder extending along the connecting rod assembly to a lower end of the connecting rod assembly, and the second rotary connecting head having a housing surrounding the connecting rod assembly in a ring shape with a transition chamber connected with an outer supply line for said fluid operating medium and with an upper end of the second feeder, and sealed towards both sides in the axial direction,
    a tool head in the form of a flushing head, located on the lower end of the connecting rod assembly; the tool head being connected with the interior of the connecting rod assembly;
    a plurality of drilling hammers operated with said fluid operating medium, located on the tool head, and operating downwards, and
    a plurality of ring seals, grouped in stages in the axial direction and hydraulically pressure-balanced in stages, the ring seals being provided in the second rotary connecting head on both sides of the transition chamber.

2. The device of claim 1, wherein a stage-by-stage pressure-balancing of said ring seals taking place symmetrically towards both sides of said transition chamber.

3. The device of claim 1, including a ring-shaped chamber being located on the side of said ring seals and turned away from the transition chamber; the ring-shaped chamber having a connection for the feed-in of a hydraulic pressure medium and being connected to a side of the same balancing the pressure in said ring seals.

4. The device of claim 3, including pumps being provided as pressure generators.

5. The device of claim 4, wherein a stage-by-stage pressure-balancing of said ring seals taking place symmetrically towards both sides of said transition chamber.

6. The device of claim 3, wherein a stage-by-stage pressure-balancing of said ring seals taking place symmetrically towards both ides of said transition chamber.

7. The device of claim 3, including pressure reducers beset with pressure by the driving medium being provided as pressure generators.

8. The device of claim 7, wherein said pressure reducers are located on the fixed housing of the second rotary connecting head.

9. The device of claim 7, wherein said pressure reducers contain cylinders for which the pressure of said fluid operating medium can be fed to a piston-rod side of the cylinder, and the pressure generated in a cylinder compartment on the other side of the piston, through its entire cross section, being reduced in accordance with the effective surface reduction on a piston-rod side and being feedable in each case to an accompanying ring-shaped chamber.

10. The device of claim 9, wherein said pressure reducers are located on the fixed housing of the second rotary connecting head.

11. The device of claim 10, wherein a stage-by-stage pressure-balancing of said ring seals taking place symmetrically towards both sides of said transition chamber.

12. A device for drilling a bore hole in the ground comprising:
    a drive unit structure to be arranged above the bore hole to be drilled in the ground, having a rotary drive device,
    a hollow connecting rod assembly on which the rotary drive device acts and which can be lowered into the hole in the ground, said connecting rod assembly allowing excavated material to be transported out of the bore hole through the interior of the connecting rod assembly and through an outlet line connected at an upper end of said connecting rod assembly, a first feeder for leading in a scavenging medium, the first feeder extending up to an inlet opening leading to the interior of said connecting rod assembly, a second feeder through which a fluid operating medium can be fed to a tool head located at a lower end of said connecting rod assembly, said fluid operating medium being pressurized and driving excavation tools provided on a tool head, said rotary drive device driving the connecting rod assembly, alternating in the direction of rotation, by a limited angle of rotation and said second feeder having a flexible area that, when the alternating rotational-direction movement is made possible, connects said second feeder with a device for impinging with pressure from the pressurized fluid operating medium.

13. The device of claim 12, wherein said first feeder has a flexible area that, when the alternating rotational-direction movement is made possible, connects said first feeder to a device for impinging with pressure from the scavenging medium.

14. The device of claim 13, wherein the outlet line has a flexible area that, when the alternating rotational-direction movement is made possible, allows the discharge of said excavation material.

15. The device of claim 14, wherein one or both supply lines is a flexible tube line.

16. The device of claim 15, wherein said supply lines are rigid in the area connected to the connecting rod assembly.

17. The device of claim 16, including a power rotary head located at said upper end of the connecting rod assembly, said power rotary head being supported by a support apparatus so as to be variable in height on the support apparatus, said rotary head serving as a rotary drive device.

18. The device of claim 17, including a rotary drive positioned in active contact with said connecting rod assembly, said rotary drive unit being provided as a rotary drive device.

19. The device of claim 18, wherein said rotary drive unit is located on said support apparatus so as to be adjustable in height.

20. The device of claim 19, including length-adjustable power generators serving the height adjustment.

21. The device of claim 20, wherein said length-adjustable power generator includes hydraulically-activated piston/cylinder units.

22. The device of claim 12, wherein said supply lines are rigid in the area connected to the connecting rod assembly.

23. The device of claim 22, including a power rotary head located at said upper end of the connecting rod assembly, said power rotary head being supported by a support apparatus so as to be variable in height on the support apparatus, said rotary head serving as a rotary drive device.

24. The device of claim 23, including a rotary drive positioned in active contact with said connecting rod assembly, said rotary drive unit being provided as a rotary drive device.

25. The device of claim 12, wherein one or both supply lines is a flexible tube line.

26. The device of claim 12, wherein the outlet line has a flexible area that, when the alternating rotational-direction movement is made possible, allows the discharge of said excavation material.

27. The device of claim 25, wherein one or both supply lines is a flexible tube line.

28. The device of claim 27, wherein said supply lines are rigid in the area connected to the connecting rod assembly.

29. The device of claim 28, including a power rotary head located at said upper end of the connecting rod assembly, said power rotary head being supported by a support apparatus so as to be variable in height on the support apparatus, said rotary head serving as a rotary drive device.

30. The device of claim 29, including a rotary drive positioned in active contact with said connecting rod assembly, said rotary drive unit being provided as a rotary drive device.

31. The device of claim 12, including a rotary drive unit positioned in active contact with said connecting rod assembly, said rotary drive unit being provided as a rotary drive device.

32. The device of claim 31, wherein said rotary drive unit is located on said support apparatus so as to be adjustable in height.

33. The device of claim 32, including length-adjustable power generators serving the height adjustment.

34. The device of claim 33, wherein said length-adjustable power generator includes hydraulically-activated position/cylinder units.

35. The device of claim 12, including a power rotary head located at said upper end of the connecting rod assembly, said power rotary head being supported by a support apparatus so as to be variable in height on the support apparatus, said rotary head serving as a rotary drive device.

36. The device of claim 35, including a rotary drive positioned in active contact with said connecting rod assembly, said rotary drive unit being provided as a rotary drive device.

37. The device of claim 12, wherein said supply lines are rigid in the area connected to the connecting rod assembly.

38. The device of claim 37, including a power rotary head located at said upper end of the connecting rod assembly, said power rotary head being supported by a support apparatus so as to be variable in height on the support apparatus, said rotary head serving as a rotary drive device.

39. The device of claim 38, including a rotary drive positioned in active contact with said connecting rod assembly, said rotary drive unit being provided as a rotary drive device.

* * * * *